June 4, 1935.  J. E. STEPHENSON  2,003,910
TENSION TESTING DEVICE FOR SPRING CONTACTS
Filed Dec. 8, 1930
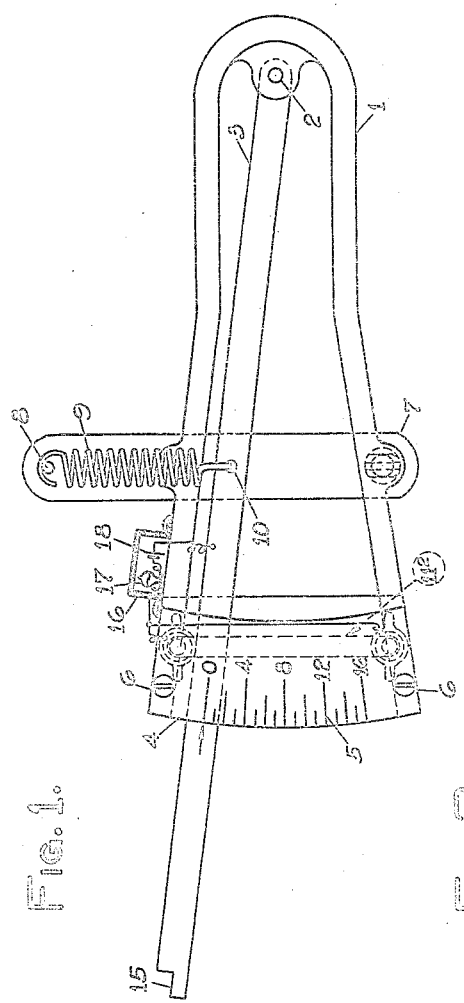
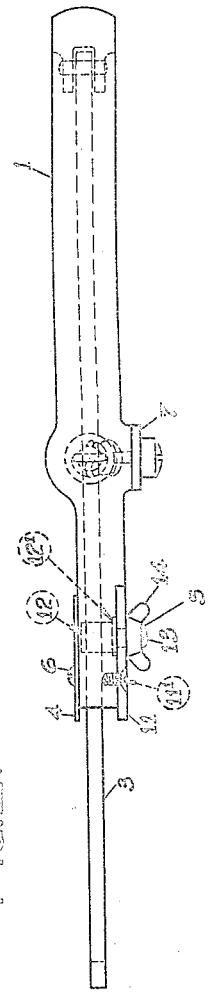
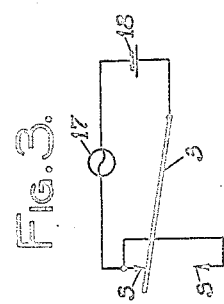
INVENTOR
J. E. Stephenson
BY Neil A. Preston
his ATTORNEY

2,003,910

UNITED STATES PATENT OFFICE 2,003,910

TENSION TESTING DEVICE FOR SPRING CONTACTS

James E. Stephenson, Rochester, N. Y., assignor to General Railway Signal Company, Rochester, N. Y.

Application December 8, 1930, Serial No. 500,803

7 Claims. (Cl. 265—18)

This invention relates in general to testing devices, and has more particular reference to a testing gauge for testing the tension of spring contacts.

It is desirable in spring contacts, and particularly in such sliding spring contacts as are used in switch machines, interlocking plants, etc., that the spring tension of such contacts be adjusted to be above a given minimum in order to insure good electrical contact, and to be below a given maximum in order to prevent due wear on the contacts due to friction wear during their sliding operation.

In the case where a large number of identical spring contacts is to be tested for spring pressure, it is desirable, in order to save time, to have means for testing them which does not require the careful reading of a graduated scale. It is also desirable that the test can be carried out accurately where space and light is at a premium.

With the above and other considerations in mind, it is proposed, in accordance with the present invention, to provide a testing gauge particularly adapted for testing large numbers of identical or like spring contacts, wherein necessity for reading a graduated scale is obviated, and means is provided for indicating whether or not the spring tension falls within desired limits.

Further objects, purposes and characteristic features of the present invention will appear as the description progresses, reference being made to the accompanying drawing, showing, wholly by way of example, and in no manner in a limiting sense, one form which the invention can assume. In the drawing:—

Fig. 1 is a plan view of a testing gauge in accordance with the present invention.

Fig. 2 is a side elevational view of the gauge.

Fig. 3 is a circuit diagram of the indicating means employed.

Referring now to the drawing, there is shown a gauge comprising a handle 1 formed of a U-shaped piece of material, having pivoted thereto, at 2, an arm 3 arranged to move over a scale plate 4, having graduations 5 thereon, and fastened, as by screws 6, to the handle 1. In the present example, the scale is graduated from 0 to 16 to indicate ounces.

Carried by the handle 1, is a support plate 7 carrying a pin 8 on which is held one end of a spring or the like 9, which has its other end fastened, as at 10, to the arm 3, the spring thereby biasing the arm 3 toward the zero position on the scale.

In a lower plate 11, fastened at 11¹ to handle 1, and formed of insulating material, is an elongated slot 11², paralleling the graduated scale 5, and arranged to slidably receive adjustable stop screw S, shown, in the present form, as comprising a stem 12, slidable in the slot 11², and having a threaded end 13, on which is received a wing nut 14, the stem 12 having a shoulder 12¹ to allow each stop pin 12 to be held in any desired position in the slot 11² by tightening up on nut 14.

The stop pins S project into the path of movement of arm 3, as it is moved against the bias of its spring 9, whereby it is possible to move the arm, for example, beyond the 4 ounces position on the scale, and then move one of the stop pins S to hold the arm against moving toward the zero position. The other stop pin S can then be moved, for example, to the 12 ounce position, and fastened there. In this manner the arm 3 can be held between the 4 and 12 ounce positions, and if now the end 15 of arm 3 be placed beneath the spring contact to be tested, and the contact opened, if arm 3 is not moved away from the pin S at the 4 ounce position, the contact spring pressure is too low. On the other hand, if arm 3 is moved enough to contact with the stop pin S at the 12 ounce position, then the pressure of the contact is too high. If the arm 3, however, assumes a position intermediate the two stop pins, then the spring pressure lies between the two limits, (4–12 ozs.) for which the gauge is set, and hence is satisfactory.

In order to facilitate determining when the spring contact is satisfactory and when it is not, the gauge is equipped with a box or container 16 of any desired character, in which is a lamp 17 or other indicating means such as a bell or the like, and a source of electrical energy, such as a battery 18. The stop pins S are insulated from the body of the gauge by the plate 11 and the various parts are wired up as shown most clearly in the diagram, (Fig. 3) so as to cause the lamp 17 to be energized whenever arm 3 is in contact with a pin S.

Thus, in testing a spring contact, it is merely necessary to notice whether the lamp becomes extinguished, and stays extinguished, during the test. If the contact pressure is too low, the lamp 17 is not extinguished, whereas, if the contact pressure is too high the lamp is first extinguished, and then re-energized.

If, instead of a lamp, a bell or the like be used, it would preferably be a bell which sounds when de-energized, whereby a continuous sounding of the bell would indicate that the spring pressure is satisfactory. If the bell does not sound, the pressure is indicated as too low, and if the bell sounds and then is silenced, the pressure is indicated as too high.

In each gauge, it is of course necessary that the scale be calibrated in accordance with its spring 9, so that the various positions of the arm 3 along the scale accurately correspond to the indicated pressures.

The gauge is also very useful with the pins S not employed, resulting pressures being read off the scale 5.

The above described gauge supplies a very economical and compact means for rapidly testing a large number of like spring contacts without the necessity for space and light, and the degree of intelligence in the operator which would be necessary for reading a graduated scale.

The above rather specific description of one form of the present invention is given solely by way of illustration, and is not intended, in any manner whatsoever, in a limiting sense. Obviously, the invention can assume many different physical forms, and is susceptible of numerous modifications, and all such forms and modifications, are intended to be included in this application, as come within the scope of the appended claims.

Having described my invention, I now claim:—

1. In a gauge, in combination, a handle, a movable biased arm carried by the handle, a graduated scale positioned to be passed over by the arm, stops for restricting movement of the arm to various predetermined sections of the scale, indicating means, and control circuits for the indicating means including the arm and the stops.

2. In a gauge, in combination, a handle, a movable biased arm carried by the handle, a graduated scale positioned to be passed over by the arm, two adjustable stops for restricting movement of the arm to any desired predetermined section of the scale, and an indicating means control circuit including the arm and one of the stops.

3. In a gauge, in combination, a handle, a movble biased arm carried by the handle, a graduated scale positioned to be passed over by the arm, two adjustable stops for restricting movement of the arm to any desired predetermined section of the scale, electrical indicating means, and a circuit for the indicating means having its completion depending on the contact relation between the arm and a said stop.

4. In a gauge, in combination, a handle, a movable biased arm carried by the handle, a graduated scale positioned to be passed over by the arm, two adjustable stops for restricting movement of the arm to any desired predetermined section of the scale, visual electrical indicating means, and a circuit to control the indicating means having its energization depending on the contact relation between the arm and a said stop.

5. In a gauge for testing contact pressures, in combination, a handle, an arm pivoted to the handle, a graduated scale over which the arm can move, means biasing the arm toward one end of the scale, slidably adjustable stop screws projecting into the path of movement of the arm for restricting movement of the arm to any predetermined portion of the scale, electrically energized indicating means, and a circuit means for controlling the indicating means and having its energization conditioned upon the contact relation of the arm and the stop screws.

6. In a gauge for testing contact pressures, in combination, a handle, an arm pivoted to the handle, a graduated scale over which the arm can move, means biasing the arm toward one end of the scale, slidably adjustable stop screws projecting into the path of movement of the arm for restricting movement of the arm to any predetermined portion of the scale, an indicating lamp, and an energizing circuit for the lamp including the arm and the two adjustable stops in multiple.

7. In a gauge for testing contact pressures, in combination, a handle, an arm pivoted to the handle, a graduated scale over which the arm can move, means biasing the arm toward one end of the scale, slidably adjustable stop screws projecting into the path of movement of the arm for restricting movement of the arm to any predetermined portion of the scale, an indicating lamp, and an energizing circuit for the lamp which is closed upon the arm contacting with either one of the two adjustable stops.

JAMES E. STEPHENSON.